NO SPECIFICATION AVAILABLE.
D. H. Southworth.
Grain Cleaner.
BEST AVAILABLE COPY
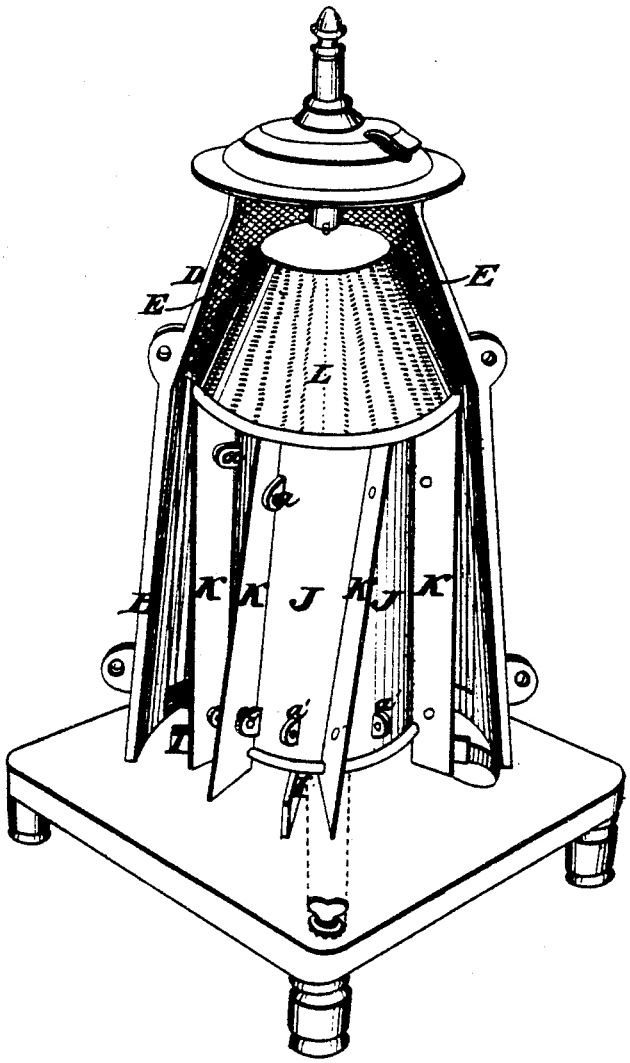
No. 48. A. I. Patented Aug. 11, 1841.